Patented Feb. 28, 1928.

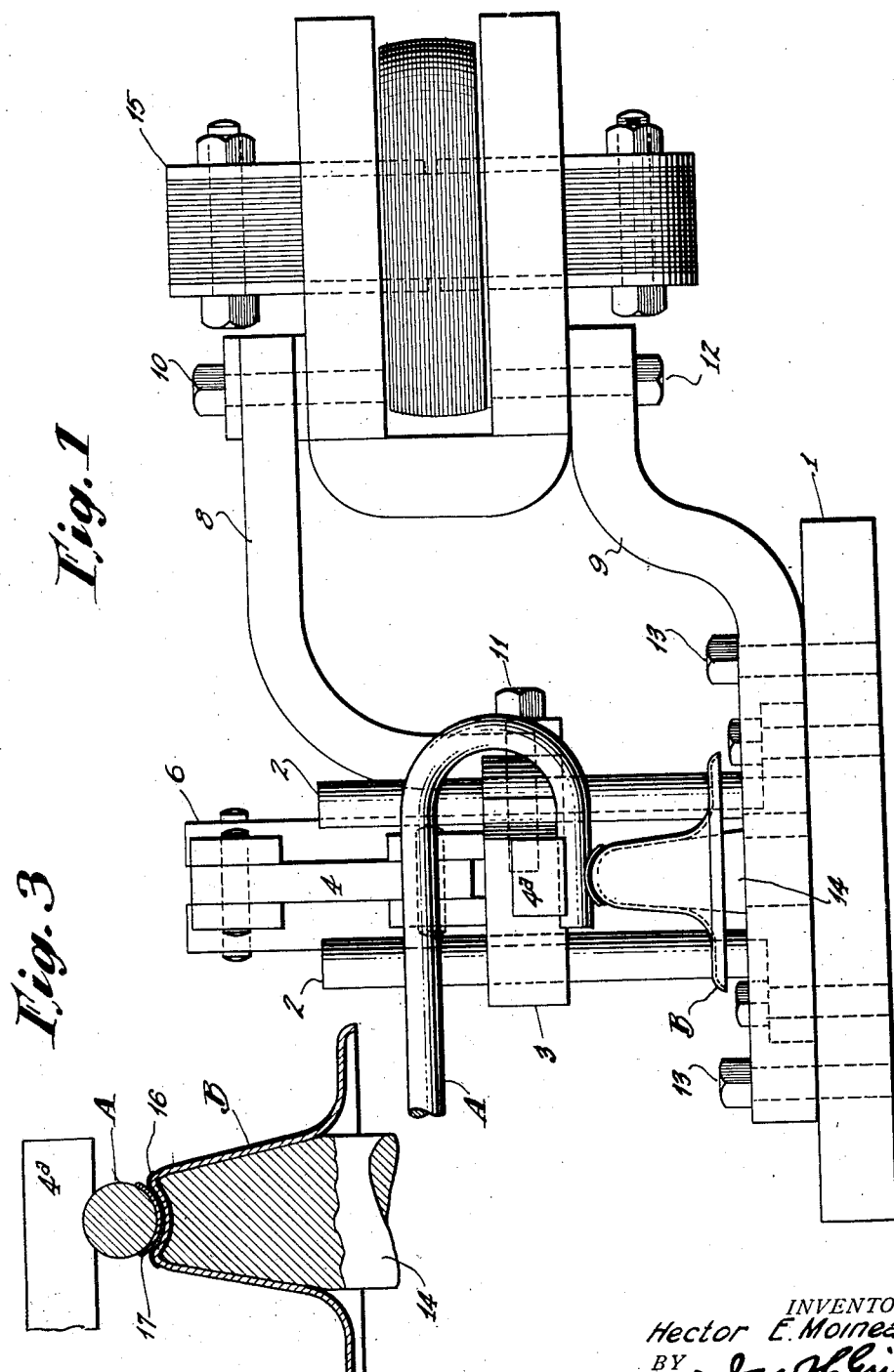

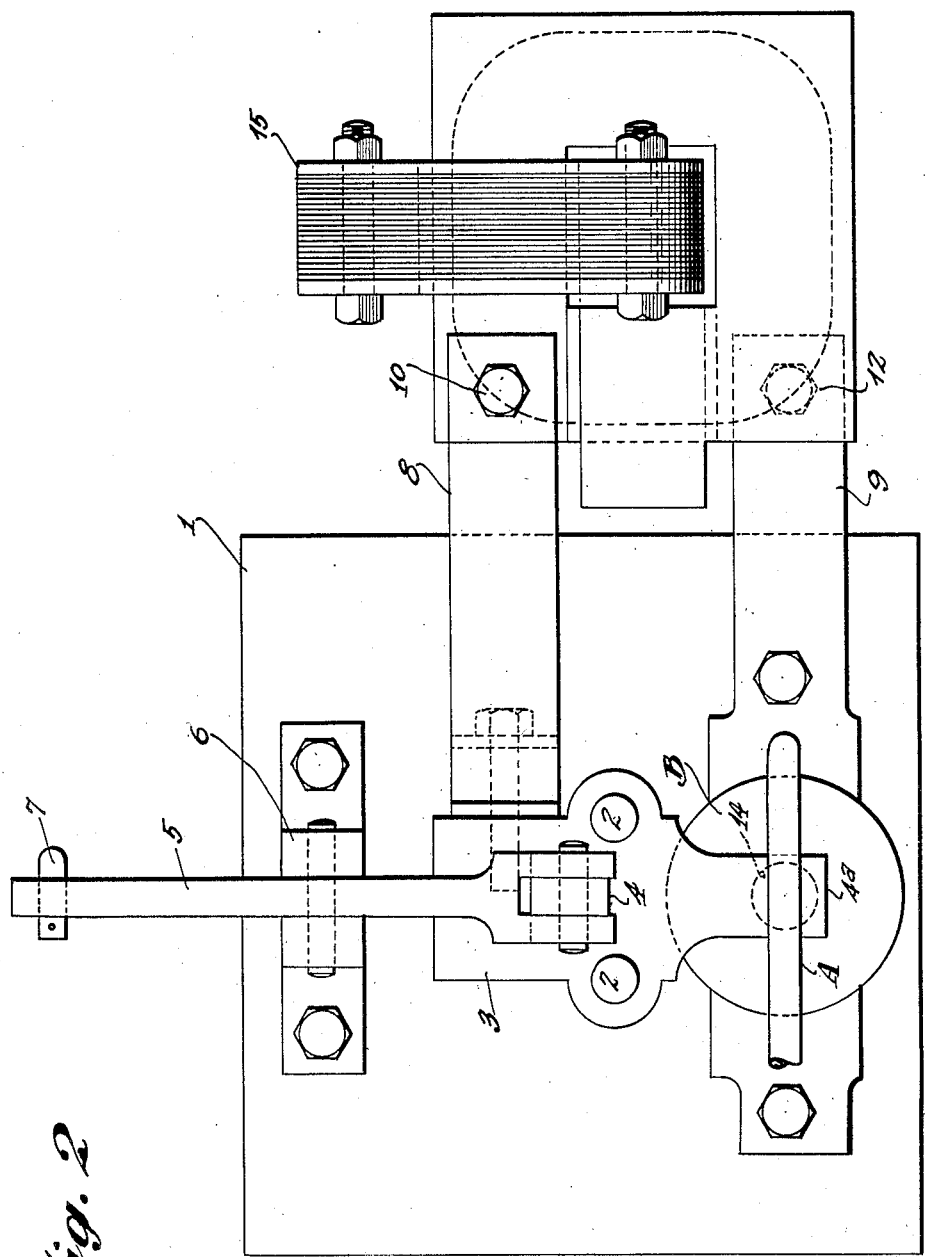

1,660,805

UNITED STATES PATENT OFFICE.

HECTOR E. MOINEAU, OF MARLBORO, MASSACHUSETTS.

METHOD OF AND APPARATUS FOR ELECTROBRAZING.

Application filed February 24, 1926. Serial No. 90,300.

This invention relates to the art of electrobrazing and embodies the method of and an apparatus for efficiently carrying out this operation.

It is a relatively simple matter in the arts to electrobraze two parts of substantially the same cross section to one another, and this operation is a common occurrence and can be satisfactorily accomplished under present methods.

It has, however, long been troublesome, and, in many cases, practically impossible without the exercise of the most highly developed skill, to electrobraze sections of widely different weight. In other words, bars of substantially the same cross section may be readily brazed together by known methods, but, if the same methods are employed in uniting a relatively heavy bar to a relatively light bar, the smaller bar will be fused before the larger bar is sufficiently heated to effect brazing.

It is even more difficult to braze solid shapes, such as bars or rods, to sheet metal, for the sheet metal heats so rapidly as to fuse before the rod can be sufficiently heated to properly braze. It is to the last mentioned field of electrobrazing that the present invention is particularly directed, although, obviously it can be used to advantage in brazing together parts, either of which are of sheet metal.

The primary object of the present invention, therefore, may be succinctly stated as to provide a method of and apparatus for brazing solid shapes to sheet metal without overheating of the parts and without necessitating a high degree of skill on the part of the workman.

It is the practice in making electrobraze unions to clamp the two parts to be brazed in such position that they will be held in contact with one another, and the clamping elements or jaws which accomplish this result generally constitute the electrodes through which the current is fed to the respective parts.

It has heretofore been the universal practice to provide substantially the same kind of electrical contact between both the electrodes and both parts to be united, so that there is substantially the same amount of resistance between one electrode and the corresponding part and the other electrode and its corresponding part. Little attention has been paid to the contact made between the electrodes and the respective parts to be united. The chief interest being in the resistance between the two parts to be united and which resistance primarily results in the heating by which the brazing is accomplished.

Long experimentation and research have led me to the conclusion that the contact had between the electrodes and the respective parts is as important, if not more so, than the contact between the two parts to be united.

I have found, in practice, that where an electrode engages one part, there is bound to be more or less resistance through the inability to obtain electrical contact without resistance. It necessarily follows that the presence of such resistance results in heating at this point. If the resistance is relatively low, the heating will be relatively negligible, but if the resistance is high, the heating will be considerable and is, in many instances, sufficient to actually cause fusing of the contacting part. I have discovered that the electrodes may be so shaped as to provide such approximate relative resistances as will be appropriate to the particular shapes or sections of which the parts to be united are formed.

I have further discovered that in the brazing of sheet metal to solid sections, it is possible to preclude premature overheating of the sheet metal part by providing for the conducting of excessive heat away from the sheet metal part, so as in a measure at least to dissipate such heat and preclude it from causing premature fusion of the sheet metal. I look upon this feature as an important advance in the art and this phase of the invention may be practically carried out in conjunction with the feature of lowering the resistance between the sheet metal and its associated electrode. In other words, I have found that if a relatively large portion of the sheet metal part is in contact with its associated electrode, the heat which would otherwise accumulate within said part is conducted away from said part or dissipated by said electrode. In other words, when a sheet metal part is in engagement with another metal part, such as an electrode, the application of heat to the sheet metal part will be rapidly dissipated through the contacting metal electrode, so that the building up or concentration of heat in the sheet metal part is appreciably retarded.

In this way, I have found it entirely practical to retard heating of the sheet metal part by providing an electrode, so shaped that it will contact with and conform to a relatively large portion of the sheet metal part, and while thus forming the electrode of the sheet metal part, the electrode cooperating with the solid part is made to have considerably less conformation therewith.

There is consequently more resistance to the passage of electrical current between the solid part and its electrode and also a comparatively small area of contact between these elements. It therefore follows that between the solid part and its electrode, there will be high resistance and greater heating with less dissipation of the heat than occurs with respect to the sheet metal part and its electrode.

Thus, in practice, it is entirely feasible to so shape and proportion the electrodes as to very closely approximate the desired conditions with respect to the mass of the parts to be brazed together and it therefore follows that the heating of the sheet metal part may be retarded to such extent that it will come to substantially brazing temperature simultaneously to the obtaining of a like condition in the solid part to be brazed thereto.

Actual practice has demonstrated the practicability of the foregoing discoveries and shows, beyond the slightest question, that the principles which have been described are fundamentally sound.

Aside from the method of electrobrazing or welding, the present invention also consists in apparatus for carrying out this method. The apparatus embodies, generally speaking, two cooperating electrodes associated with a suitable source of current supply with means for moving the electrodes into and out of cooperative relation with one another and for clamping the parts, to be united, together by said electrodes when in brazing positions.

A salient feature of the present invention from this mechanical standpoint is that the electrode with which the sheet metal part cooperates is shaped to conform with said part and to have a substantially good extensive electrical and mechanical contact therewith, while the electrode which cooperates with the solid section is shaped to have a substantially poor electrical contact and relatively inextensive mechanical contact therewith.

There results in such a construction a retarded heating of the sheet metal part and an accelerated heating of the solid part, so that said parts are simultaneously brought to the desired temperature and premature fusing of either one of them does not, in practice, occur, even though the operations are carried out by relatively inexperienced operatives.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a front elevation of brazing apparatus embodying the present invention.

Figure 2 is a plan view of the apparatus shown in Figure 1; and,

Figure 3 is a fragmental section on the line 3—3 of Figure 1.

Referring to the drawings, 1 designates a suitable bed carrying guides 2 on which a cross head 3 is mounted to reciprocate. The cross head 3 is connected by a link 4 to a rocker 5 pivoted intermediate its ends on a bracket 6 mounted on the bed and the free end of the rocker arm is secured by a link 7 to any suitable operating means whereby the arm 5 may be rocked for the purpose of reciprocating the cross head on the guides 2.

Positioned in proximity to the bed is a suitable transformer 15 constructed to feed appropriate current through conductors 8 and 9 to the respective electrodes of the apparatus. These conductors may conveniently be in the form of laminated sheet copper. The conductor 8 is secured to the transformer by a bolt 10 and to the cross head by a bolt 11. The conductor 9 is secured to the transformer by a bolt 12 and to the bed by bolts 13. Secured to the lead 9 in any suitable manner is the bed electrode 14, hereinafter called the fixed electrode, having the best possible electrical connection with the lead 9. The forward projecting nose 4ª of the cross head constitutes the cross head electrode, hereinafter termed the movable electrode.

For the purpose of illustration, I have shown the parts to be brazed together as embodying a relatively heavy circular rod A and a relatively thin sheet metal shell B, the former of which is adapted to cooperate with the movable electrode 4ª and the latter of which is adapted to cooperate with the fixed electrode 14. It will be noted particularly from Figure 3 that the electrode 14 is shaped to fit into and conform to an appreciable portion of the sheet metal shell B. As a matter of fact, it is illustrated as contacting with the major portion of said shell, so that there will be a relatively extensive good electrical contact between the shell and the electrode and of course a relatively extensive good physical contact between them. Accordingly, when current is fed to the shell from the electrode 14 or vice versa, it will be relatively low resistance to the passage of current between these parts.

Moreover, heating of the shell will be appreciably retarded by virtue of the fact that as heat is generated in the shell, it is conducted away from the shell by the electrode 14. There is thus produced a condition of minimum heating between these elements and at the same time a condition conductive to rapid dissipation of the heat from the thin shell B into the larger mass of the electrode 14.

In contradistinction to the conditions described as prevalent with respect to the shell B, it will be noted that the electrode 4ᵃ has a relatively small contact area with the rod A and it therefore follows that the resistance between the electrode and the rod will be greater than the resistance between shell B and its electrode 14. Furthermore, since there is a relatively small physical contact between the parts 4ᵃ and A, it follows that there is relatively little heat conducted away from the part A by the electrode 4ᵃ. I find it in practice a relatively simple matter to so shape and proportion the electrodes with respect to the parts A and B that the resistances may be properly proportioned and the dissipation of the heat also properly proportioned with the result that the heating of the shell B will be held back or retarded to such extent that it will not come to a brazing temperature at the point of its contact with the part A until the latter part has been brought to brazing temperature.

It will of course be understood that in brazing the parts together, a suitable flux 16 and a brazing or welding metal 17, both of which are diagrammatically shown in Figure 3, are employed, so that at the commencement of the brazing operation, there need not be actual contact between the parts A and B, but this will be clearly understood in the art. Moreover, while I have shown the elements 16 and 17 as separate, independent elements, I may use a brazing compound without departing from the invention, which consists in the method, as hereinbefore fully described.

It will thus be seen that the invention embodies two outstanding features, one of which refers to the matter of resistance between the electrodes and the corresponding parts and the other of which relates to the retarding of the heating by dissipation of the heat from the part of the less mass. The latter of these considerations is deemed the more important and, in practice, may be availed of without accurate regard to resistance and fairly good results can be obtained. In the preferred manner of carrying out the method, however, both of the factors under consideration should be given due regard for the best possible results.

Practical demonstration has shown that the apparatus as shown in the drawings will give highly efficient results, but inasmuch as such apparatus may vary in welding different parts together in order to conform with the requirements of the several environs in which it is adapted for use, I wish it clearly understood that the method of this invention is not limited to this apparatus and that the invention is fully commensurate with the appended claims.

Having thus fully described the invention, what I claim as new and desire to secure by Letters Patent is:

1. The method of electrobrazing wire rods to sheet metal shells, which consists in clamping the parts together with a brazing metal and a flux between them, then passing an electric current between said parts via the flux and brazing metal, distributing the feed of current to the sheet metal to preclude local overheating and concentrating the heating of the rod by localizing the feed of current thereto, whereby the rod and sheet metal are heated at the prospective joint in a substantially uniform manner, and maintaining the flow of current until the brazing metal is fused and bonded.

2. In an apparatus for brazing sheet metal shells to wire rods, a relatively stationary bed, an electrode mounted on said bed and shaped to fit into and conform to a shell to have a relatively large contact area therewith, guides also mounted on the bed, a cross head movable on the guides toward and away from the bed, a relatively small electrode carried by the cross head and adapted to make a relatively small area contact with a rod, means for feeding current to the electrodes, and means for moving the cross head to bring the electrode thereon into and out of cooperative relation with the electrode of the bed, to clamp such rod to the shell with a body of flux and brazing metal between the rod and shell.

In testimony whereof I have signed the foregoing specification.

HECTOR E. MOINEAU.